3,355,366
PROCESS FOR INHIBITING FOAMING OF HEXACHLOROBUTADIENE-1,3 BY ADDITION OF DIATOMACEOUS EARTH
William Q. Beard, Baton Rouge, La., assignor to Ethyl Corporation, New York, N.Y., a corporation of Virginia
No Drawing. Filed Jan. 21, 1966, Ser. No. 522,055
1 Claim. (Cl. 203—20)

ABSTRACT OF THE DISCLOSURE

A process for inhibiting foaming of boiling hexachlorobutadiene-1,3 by adding particulate diatomaceous earth thereto.

---

This invention relates to the prevention or reduction of foaming in boiling liquid systems, especially in the distillation and/or refluxing of organic compounds.

It has been observed that the addition of diatomite to organic compounds prone to foaming will cause such foaming to subside to the point that a normal distillation or similar operation may be carried out. Additionally, a further advantage is that diatomites are easily removed or separated from residual liquids since diatomites are insoluble solids in most organic liquids under a wide range of temperature and pressure. Also, inasmuch as diatomites are predominantly silica and alumina, there is no danger of reaction with the components of the liquid system or of interference with any of a wide variety of chemical reactions which may desirably occur unhampered in the liquid system.

Diatomites include diatomaceous earth, kieselguhr, siliceous earth, ceyssatite, tripolite and infusorial earth. Diatomite is a soft earthy rock composed of the siliceous skeletons of small aquatic plants called diatoms. As marketed it consists of light colored rocks, bricks, powder or lumps resembling chalk or dried clay in appearance. A typical analysis is: silica ($SiO_2$) 86.89 percent, alumina ($Al_2O_3$) 2.32 percent, ferric oxide ($Fe_2O_3$) 1.28 percent, lime (CaO) 0.34 percent, potash ($K_2O$) 3.58 percent, water ($H_2O$) 4.89 percent.

Organic liquids prone to foaming are well known in the art and reference may be had in relation thereto to such texts as Emulsions and Foams, by Sophia Berkman and Gustav Egloff, copyright 1941 by Reinhold Publishing Corporation, and Foams: Theory and Industrial Applications by J. J. Bikerman in collaboration with J. M. Perri, R. B. Booth and C. C. Currie, copyright 1953, also by Reinhold. The Bikerman text contains an able discussion of the use of silicones as foam inhibitors. The author notes that certain of the silicones have approached the goal of universal antifoam agents. The present invention has been compared with several silicone antifoam agents and found far superior. For example, in the distillation of crude hexachlorobutadiene-1,3 silicone antifoam agents such as General Electric Company Antifoam 44 and 66 (trademarks not registered) showed no appreciable effect, and foaming was so vigorous as to prevent distillation entirely. However, with the addition of diatomite the extreme foaming encountered subsided to the point that a normal distillation could be carried out.

This invention is in part illustrated by the following examples and experimental results:

Example I

About 0.25 gram of Johns-Manville "Celite" filter aid was added to 160 grams of crude hexachloro-1,3-butadiene. This caused the extreme foaming encountered to subside to the point that a normal distillation could be carried out. In the absence of this additive, excessive foaming was encountered when it was attempted to distill this chlorinated hydrocarbon.

Example II

About 0.4 gram of Johns-Manville "Celite" filter aid was added to 160 grams of crude hexachloro-1,3-butadiene. No foaming was observed during distillation.

It is of course evident that the amount of diatomite to be added to a liquid system depends upon the amount of liquid present in the system and the extent to which it is desired to reduce foaming. Manifestly also, the amount of diatomite employed will vary with different liquid systems, but this amount will in any event be small relative to the liquid present. The desired amount of diatomite is in all cases easily determined by recourse to simple experimentation. Advantageously, diatomite may be added to the liquid system at any time during the distillation, refluxing or similar operation. Of course, it is in most cases preferable to add diatomite at the start or prior to the start of the operation. In a preferred physical state of use diatomite may be described generically as particulate and more specifically as powdery, granular, sabulous, floury, friable, pulverulent, arenaceous, mealy, scurfy, crumbly, shivery, farinaceous, arenose, branny, gritty, or the like.

Johns-Manville "Celite" is a trademark for a line of diatomaceous silica products commonly used as filter aids, mineral fillers, and insulations. These materials are produced from an unusual mineral deposit found in southern California and consist of the skeletal remains of very small organisms called diatoms. The mined mineral is crushed, blended, dried, calcined, and flux-calcined to the desired product. The average analysis, on a dry basis, of the uncalcined "Celite" is as follows: 89.0 percent silicon dioxide ($SiO_2$), 3.7 percent $Al_2O_3$, 1.5 percent $Fe_2O_3$, 0.1 percent $TiO_2$, 0.4 percent CaO, 0.7 percent MgO, 0.8 percent alkalis (as $Na_2O$), and 3.7 percent ignition loss (combined $H_2O$, $CO_2$ and organics).

It will be understood that while there have been given herein certain specific examples of the practice of this invention, it is not intended thereby to have this invention limited to or circumscribed by the specific details for materials, portions, or conditions herein specified, in view of the fact that this invention may be modified according to individual preference or conditions without necessarily departing from the spirit of the disclosure and the scope of the appended claim.

Having thus set forth the invention, what is claimed is:

A process for inhibiting foaming normally encountered during boiling of a foamable liquid comprising hexachlorobutadiene-1,3 comprising adding particulate diatomaceous earth to said foamable liquid in an amount sufficient to reduce the foaming tendencies thereof.

References Cited

UNITED STATES PATENTS

| | | | |
|---|---|---|---|
| 1,939,937 | 12/1933 | Werner | 252—321 |
| 2,993,867 | 7/1961 | Wilson | 203—20 |
| 3,076,768 | 2/1963 | Boylan | 252—321 |
| 3,267,042 | 8/1966 | Domba | 252—321 |
| 3,304,266 | 2/1967 | Sullivan | 252—321 |

OTHER REFERENCES

Russian Chemical Reviews, April 1964, vol. 33, No. 4, pp. 182–184.

WILBUR L. BASCOMB, JR., *Primary Examiner.*